United States Patent [19]

Russell

[11] Patent Number: 5,046,254

[45] Date of Patent: Sep. 10, 1991

[54] GARDENING TOOL

[76] Inventor: Sam C. Russell, 15609 E. 42nd Pl., Independence, Mo. 64055

[21] Appl. No.: 492,133

[22] Filed: Mar. 13, 1990

[51] Int. Cl.[5] .......................... B25G 1/06; B26B 3/00
[52] U.S. Cl. ........................................ 30/309; 30/318
[58] Field of Search ................. 30/309, 346, 348, 318

[56] References Cited

U.S. PATENT DOCUMENTS

| | | | |
|---|---|---|---|
| 1,078,152 | 11/1913 | Le Baron | 30/309 |
| 1,353,631 | 9/1920 | Collicutt | 30/309 |
| 1,777,029 | 8/1930 | Bradford | 30/318 |
| 1,895,055 | 1/1933 | Steinour et al. | 30/318 |
| 2,011,062 | 8/1935 | Masamitsu | 30/318 |
| 2,033,797 | 3/1936 | Whitney | 30/318 |
| 2,070,041 | 2/1937 | Coe | 30/318 |
| 2,283,322 | 5/1942 | Edell | 30/318 |

Primary Examiner—Douglas D. Watts
Assistant Examiner—Paul M. Heyrana, Sr.
Attorney, Agent, or Firm—H. Jay Spiegel

[57] ABSTRACT

The present invention relates to an improved gardening tool. The improved gardening tool is seen to include a V-shaped tool portion having a plurality of V-shaped cutting edges therein. The tool portion includes a connecting means thereon which is adapted to removably receive a handle. The tool portion and handle are removably attachable to facilitate using different configurations of handles as well as different sized tool portions.

5 Claims, 2 Drawing Sheets

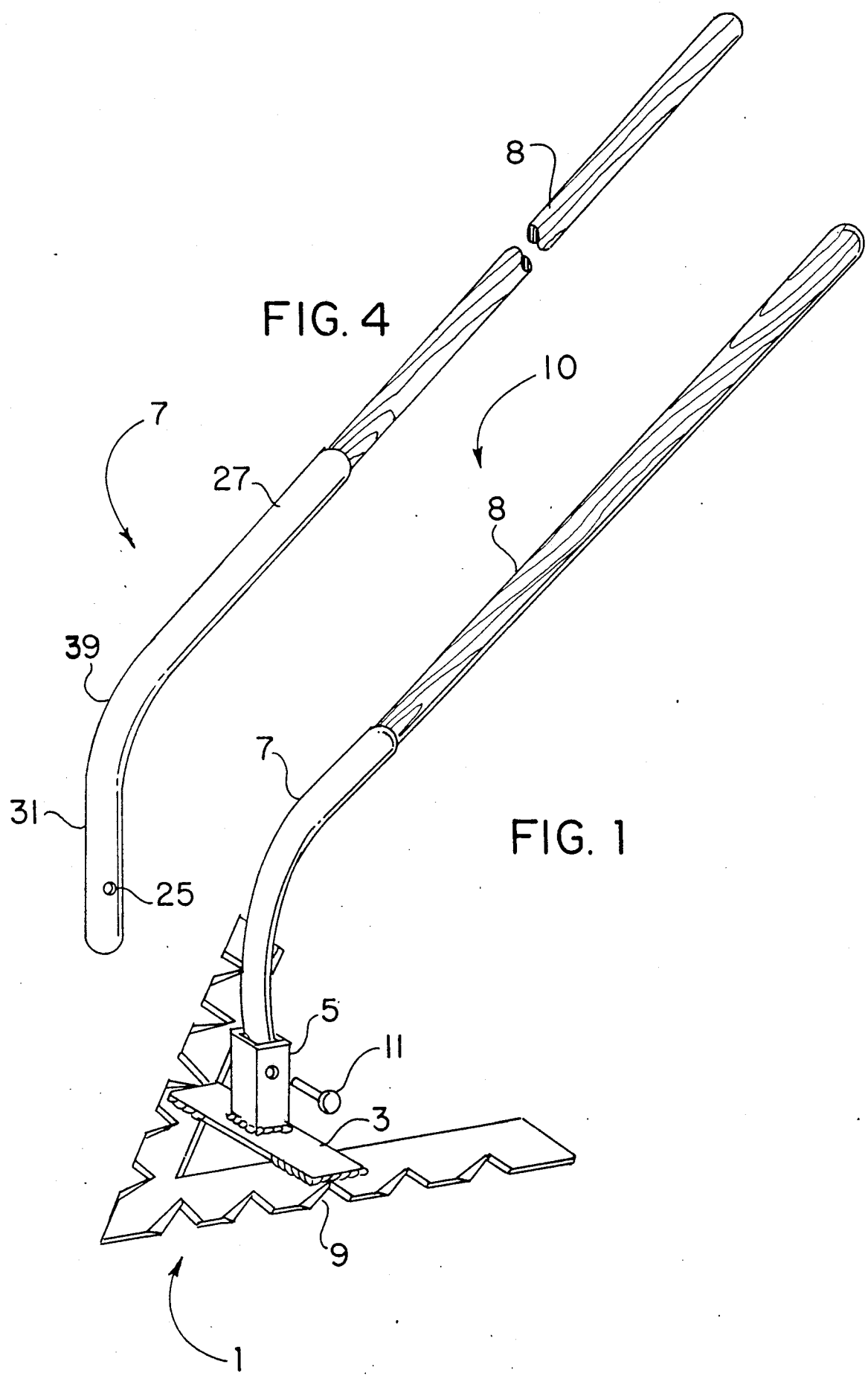

GARDENING TOOL

BACKGROUND OF THE INVENTION

The present invention relates to an improved gardening tool. In the prior art, gardening tools are known. U.S. Pat. No. 789,803 to Garrison and U.S. Pat. No. 2,809,427 to Bradford are examples of gardening tools with U.S. Pat. No. 2,551,899 to Pfeifer et al. disclosing another example of a gardening tool. The Pfeifer et al. gardening tool is seen to include a plurality of stepped edges on a cutting blade that is attached to a handle.

Applicant is unaware of any prior art gardening tools which include all of the features and aspects of the present invention including an improved gardening tool having a V-shaped tool portion containing therein a plurality of V-shaped cutting edges.

SUMMARY OF THE INVENTION

The present invention relates to an improved gardening tool. The present invention includes the following interrelated aspects and features:

A) In a first aspect, the improved gardening tool includes a tool portion, a handle portion and a connecting means being adapted to join the tool portion to the handle portion.

B) The tool portion is configured in a V-shape and is seen to include a plurality of V-shaped cutting edges therein. The cutting edges include a beveled portion therein which terminates in a sharpened edge which permits shearing or cutting during use in a garden.

C) The connecting means is attached to the tool portion and is adapted to removably receive a handle. The handle may have a curved portion therein to facilitate using the improved gardening tool while in an upright position.

D) Both the tool portion and the handle may come in different sizes to facilitate using the gardening tool for different purposes in the garden. The connecting means allows interchangeability between different sized tool portions and handles.

Accordingly, it is a first object of the present invention to provide an improved gardening tool.

It is a further object of the present invention to provide such a device including a V-shaped tool portion having a plurality of V-shaped cutting edges therein.

It is a yet further object of the present invention to provide an improved gardening tool permitting interchangeability between different sized handles and/or tool portions.

These and other objects, aspects and features of the present invention will be better understood from the following detailed description of the preferred embodiment when read in conjunction with the appended drawing figures.

BRIEF DESCRIPTION OF THE DRAWINGS

FIG. 1 shows a perspective view of the improved gardening tool.

FIG. 4 shows a perspective view of the handle removed from the tool portion of the improved gardening tool.

SPECIFIC DESCRIPTION OF THE PREFERRED EMBODIMENT

Figure 3:
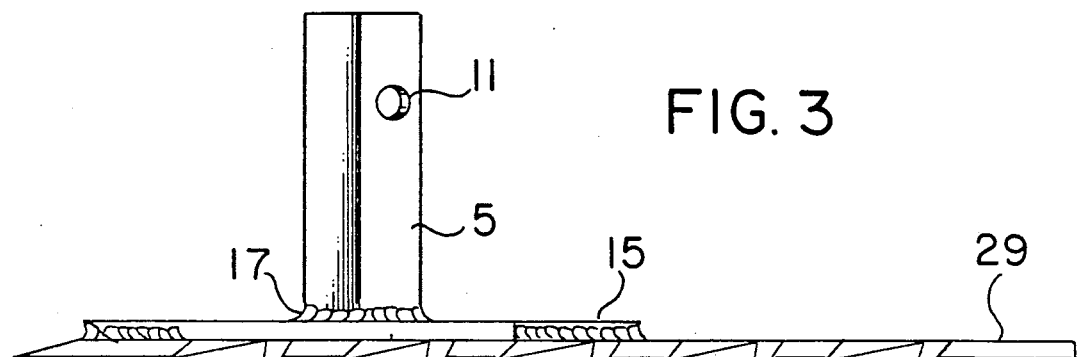
FIG. 3 shows a side view of the tool portion and connecting means.

With reference, first, to FIG. 1, the improved gardening tool is generally designated by the reference numeral 10 and is seen to include a V-shaped tool portion 1 having a plurality of V-shaped cutting edges 9 therein. Attached to the tool portion 1 is a connecting plate 3, the connecting plate 3 having attached thereto a square handle receiving member 5.

The handle may include a wooden portion 8 and a metal curved portion 7. The wooden portion 8 is shown press-fit into the hollow curved metal portion 7. However, other means of attachment between the metal curved portion 7 and the wooden handle 8 may be utilized such as fasteners or the like.

The square metal member 5 has an opening therein which is adapted to receive a pin 11 which connects the metal handle portion 7 to the tool portion 1. This means of attachment permits different handles to be utilized with a particular tool portion or, in the alternative, different sized tool portions may be used with a particular handle. Of course, other types of means may be utilized to removably connect the handle to the tool portion such as a nut and bolt or the like.

Figure 2:
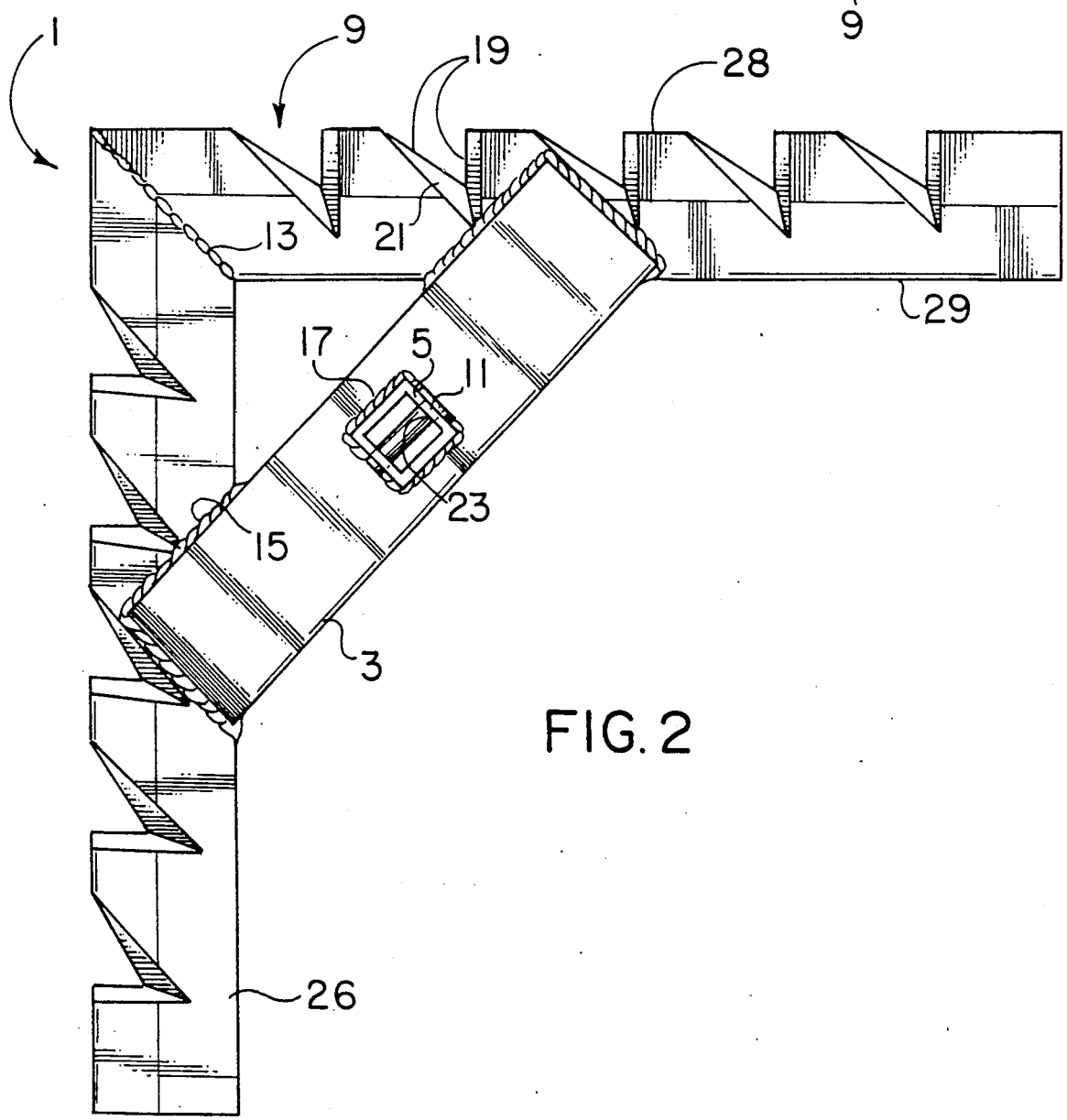
FIG. 2 shows a top view of the tool portion and connecting means.

With reference to FIGS. 2 and 3, the tool portion 1 is more clearly illustrated and is seen to include a first portion 26 joined to a second portion 29 by the weld 13. The joining of members 26 and 29 in this fashion creates a V-shape which enhances the cutting action of the tool when used in a garden. Each of the members 26 and 29 have a plurality of V-shaped cutting edges 9 therein. Each cutting edge 9 has a pair of beveled portions 21 which terminate in sharpened cutting edges 19. Of course, more or less of the cutting edges 9 may be located on either the member 26 or the member 29. Each of the members 26 and 29 have a beveled edge 28 thereon which facilitates pushing the gardening tool in a forward motion. A preferred angle for the beveled edge 28 would include about 10°.

As can be seen from the drawings, the connecting plate 3 is attached to the members 26 and 29 by the welds 15. Of course, other means of attachment may be utilized such as nuts and bolts or screws.

The square connecting member 5 is shown welded to the connecting plate 3 at the reference numeral 17. The connecting member 5 has an opening 23 therein which is adapted to receive the connecting pin 11 which secures the handle when inserted into the square connecting member 5.

With reference to FIG. 4 and again FIG. 2, the curved metal portion 7 has an opening 25 therein which aligns with the opening 23 in the square connecting member 5 such that the handle may be securely held by the connecting pin 11. The curved metal member 7 is seen to include a straight portion 31 which is adapted to fit within the square metal member 5, a curved portion 39 and a straight portion 27. The curved portion 39 may have a radius of approximately 45° such that a user may comfortably use the improved gardening tool while standing up.

The tool portion may also be reversed 180° on the handle so that the tool portion may be pulled towards a user during gardening to reach under plants and other hard to access areas. Additionally, the handle may comprise a typical garden tool handle having a ferrule on one end thereof and a rod having one end designed to be inserted into the connecting member 5 with the other end designed to attach to the ferrule. Of course, other known types of handles may be utilized with the inventive gardening tool.

Preferred dimensions for the improved gardening tool would include the members 26 and 29 being 6 ½ inches in length and 1 inch in width and the connecting plate 3 being 4 inches in length and 1 inch in width. The cutting edges 9 may be ⅜ inches deep and ⅜ inches wide. The bevel of the members 26 and 29 may be approximately 10 degrees. Regarding the metal curved portion 7, the portion 27 may be 4 ¾ inches, the portion 31 may be 1 ¾ inches and the diameter of the handle portion 7 may be ⅜ inches. Of course, these dimensions are merely exemplary and one skilled in the art may utilize different dimensions according to the particular use required.

The improved gardening tool may be made out of any materials. A preferred material would include a carbon steel for the tool portion, connecting plate, connecting member and the handle portion 7. Use of this material would facilitate attaching the various components together as well as providing for a durable and strong device.

The improved gardening tool offers many advantages over other prior art devices. The unique V-shaped tool portion having the V-shaped cutting edges therein provides an efficient and quick way of shearing unwanted weeds and other growth in a garden. Furthermore, the configuration of the handle in combination with the V-shaped tool portion and cutting edges minimizes strain on a user during the gardening process.

As such, an invention has been disclosed in terms of a preferred embodiment thereof which fulfills each and every one of the objects of the invention as set forth hereinabove and provides an improved gardening tool of great novelty and utility. Of course, various changes, modifications and alterations in the teachings of the present invention may be contemplated by those skilled in the art without departing from the intended spirit and scope thereof. As such, it is intended that the present invention only be limited by the terms of the appended claims.

I claim:

1. An improved gardening tool comprising:
   a) a tool portion, said tool portion further comprising a V-shaped member having first and second legs meeting at a vertex, each leg having a top surface, a bottom surface and an axis of elongation, said V-shaped member includes a first beveled edge, said V-shaped member further including a plurality of V-shaped cutting edges therein, each said V-shaped cutting edge consisting of second and third beveled edges, each of said second and third beveled edges terminating in a sharp edge at said bottom surface, each said cutting edge being configured to create a V-shape in said V-shaped cutting edge with each of said third beveled edges being generally perpendicular to the axis of elongation of the leg on which it is located;
   b) a handle; and
   c) a connecting means for removably connecting said tool portion to said handle with said handle having a connecting portion generally perpendicular to said tool portion.

2. The invention of claim 1, wherein said connecting means further comprises a plate attached to said V-shaped member and a hollow connecting member having an opening therethrough attached to said plate.

3. The invention of claim 2, wherein said handle further includes a hollow metal tube having a curved portion therein, said hollow metal tube having a further opening therethrough, said further opening aligning with said opening in said hollow connecting member.

4. The invention of claim 1, wherein said V-shaped member further comprises a first member integrally attached to a second member, said first and said second members forming said V-shape.

5. The invention of claim 1, wherein said first and said second members are welded together.

* * * * *